US010895643B2

(12) United States Patent
Kiy et al.

(10) Patent No.: US 10,895,643 B2
(45) Date of Patent: Jan. 19, 2021

(54) INTELLIGENT ILLUMINATION SYSTEMS USING MODULATED LIGHT (71) Applicant: ams Sensors Singapore Pte. Ltd., Singapore (SG)

(72) Inventors: Michael Kiy, Winterthur (CH); Bernhard Büttgen, Adliswil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 289 days.

(21) Appl. No.: 15/749,801

(22) PCT Filed: Aug. 3, 2016

(86) PCT No.: PCT/SG2016/050375
§ 371 (c)(1),
(2) Date: Feb. 2, 2018

(87) PCT Pub. No.: WO2017/023208
PCT Pub. Date: Feb. 9, 2017

(65) Prior Publication Data
US 2018/0224551 A1 Aug. 9, 2018

Related U.S. Application Data (60) Provisional application No. 62/201,169, filed on Aug. 5, 2015.

(51) Int. Cl.
*G01C 3/08* (2006.01)
*G01S 17/87* (2020.01)
(Continued)

(52) U.S. Cl.
CPC .......... *G01S 17/87* (2013.01); *G01S 7/4808* (2013.01); *G01S 7/491* (2013.01); *G01S 7/4911* (2013.01);
(Continued)

(58) Field of Classification Search
CPC ...... G01S 7/4911; G01S 7/491; G01S 7/4808; G01S 17/32; G01S 17/04; G01S 17/87;
(Continued)

(56) References Cited

U.S. PATENT DOCUMENTS

2013/0106692 A1 5/2013 Maizels et al.
2013/0127854 A1* 5/2013 Shpunt ................. H04N 13/363
345/420

(Continued)

OTHER PUBLICATIONS

ISA/AU, International Search Report for PCT/SG2016/050375 (dated Oct. 7, 2016).
(Continued)

*Primary Examiner* — Mark Hellner
(74) *Attorney, Agent, or Firm* — Michael Best and Friedrich LLP (57) ABSTRACT The present disclosure describes intelligent illumination systems that use modulated light. For example, in one aspect, a method includes producing, by a light source, modulated illumination in a visible part of the spectrum, detecting three-dimensional image data based on at least a portion of the modulated light produced by the light source and reflected by a scene, and changing a characteristic of the modulated illumination based on the detected three-dimensional image data.

18 Claims, 8 Drawing Sheets (51) Int. Cl.
  *G01S 17/89* (2020.01)
  *G01S 7/48* (2006.01)
  *G01S 7/491* (2020.01)
  *G01S 17/66* (2006.01)
  *G01S 17/32* (2020.01)
  *H05B 47/105* (2020.01)
  *G01S 17/04* (2020.01)
  *G01S 7/4911* (2020.01)
  *G03B 15/02* (2006.01)

(52) U.S. Cl.
  CPC .............. *G01S 17/04* (2020.01); *G01S 17/32* (2013.01); *G01S 17/66* (2013.01); *G01S 17/89* (2013.01); *H05B 47/105* (2020.01); *G03B 15/02* (2013.01); *Y02B 20/40* (2013.01)

(58) Field of Classification Search
  CPC ....... G01S 17/66; G01S 17/89; H05B 47/105; Y02B 20/48; G03B 15/02

USPC ....................................................... 356/5.01
See application file for complete search history.

(56) References Cited

U.S. PATENT DOCUMENTS

2014/0159589 A1  6/2014  Pandharipande et al.
2015/0061509 A1  3/2015  Karlicek et al.

OTHER PUBLICATIONS

Chow, et al., "Improved modulation speed of LED visible light communication system integrated to main electricity network," Electronics Letters 47(15) (Jul. 21, 2011).

Hongda, et al., "Advances and prospects in visible light communications," Journal of Semiconductors 37(1) (Jan. 2016).

* cited by examiner

INTELLIGENT ILLUMINATION SYSTEMS USING MODULATED LIGHT

CROSS-REFERENCE TO RELATED APPLICATION(S)

The present application claims the benefit of priority of U.S. Provisional Patent Application No. 62/201,169, filed on Aug. 5, 2015, the disclosure of which is incorporated herein by reference.

FIELD OF THE DISCLOSURE

The present disclosure relates to intelligent illumination systems that use modulated light.

BACKGROUND

Some lighting control systems provide for sophisticated features such as daylight sensing, occupancy sensing, and centralized lighting control and management. In some cases, motion sensors are mounted in or on the lighting fixtures. The motion sensors can be used to detect, for example, when a person enters a room. In response, the lighting control system can be used, for example, to control when the lighting in the room is turned on, off or dimmed, which can be helpful for providing more efficient use of energy and other resources.

SUMMARY

The present disclosure describes intelligent illumination systems that use modulated light.

For example, in one aspect, a method includes producing, by a light source, modulated illumination in a visible part of the spectrum, detecting three-dimensional image data based on at least a portion of the modulated light produced by the light source and reflected by a scene, and changing a characteristic of the modulated illumination based on the detected three-dimensional image data.

Some implementations include one or more of the following features. For example, changing a characteristic of the modulated illumination can include changing an intensity of the modulated illumination. In some instances, an intensity of the modulated illumination can be changed based on a location of an object (e.g., a person) in the scene as determined from the three-dimensional image data.

In some cases, changing a characteristic of the modulated illumination includes changing a color temperature of the modulated illumination. The color temperature of the modulated illumination can be changed, for example, based on a location of an object (e.g., a person) in the scene as determined from the three-dimensional image data. In some instances, a color temperature of the modulated illumination can be changed based on a number of persons in the scene as determined from the three-dimensional image data.

In another aspect, an apparatus includes an illuminator including a first light source operable to produce modulated illumination in a visible part of the spectrum, and a light sensor operable to detect three-dimensional image data based at least on a portion of the modulated illumination reflected by a scene. A host device is operable to receive signals indicative of the three-dimensional image data, and is operable to generate one or more control signals to affect a change in a characteristic of the modulated illumination of the first light source based on the signals indicative of the three-dimensional image data.

Some implementations include a time-of-flight sensor to detect the three-dimensional image data.

In some instances, the illuminator includes a second light source operable to produce modulated illumination in an infra-red part of the spectrum. The light sensor can be further operable to detect three-dimensional image data based at least on a portion of the modulated infra-red illumination reflected by a scene. The host device is further operable to determine the presence of the object based on the three-dimensional image data generated from the modulated infra-red illumination reflected by the scene and detected by the light sensor, and to generate, in response to determining the presence of the object, one or more control signals to cause the first light source to be turned on.

In some implementations, the illuminator includes a second light source operable to produce modulated illumination in an infra-red part of the spectrum. The apparatus including light sensitive elements operable to detect three-dimensional image data based at least on a portion of the modulated infra-red illumination reflected by the scene. The host device is further operable to generate one or more control signals to cause the second light source to be turned on under specified conditions, to detect a location of an object based on the three-dimensional image data acquired by the light sensitive elements, and in response to detecting the location of the object, to generate one or more signals to adjust a characteristic of the modulated light produced by the first light source.

Another aspect describes an apparatus that includes an illuminator. The illuminator includes a first light source that includes a multitude of light emitting elements each of which is operable to produce modulated light of a different respective wavelength or range of wavelengths in a visible part of the spectrum. A light sensor includes one or more pixels that are sensitive to the wavelengths of light emitted by the light emitting elements, the light sensor being operable to collect spectral and three-dimensional image data based on light reflected from the scene. A host device is operable to receive signals indicative of the spectral and three-dimensional image data, and to generate one or more control signals to adjust an intensity of at least one of the light emitting elements based on the spectral and three-dimensional image data. In some instances, the host device is operable to generate the one or more control signals to achieve or maintain a particular color temperature. Further, in some instances, the host device is operable to generate the one or more control signals to adjust a color temperature based on a location of a person detected or based on presence of a number of people detected.

Other aspects, features and advantages will be readily apparent from the following detailed description, the accompanying drawings, and the claims.

DETAILED DESCRIPTION

The present disclosure describes intelligent illumination systems that use modulated light. The lighting systems are operable to collect and determine, for example, position or other information about one or more people in a room and, in response, to control the illuminator. For example, in some cases, the system controls the intensity of light generated by the illuminator based on the position of a person in the room. Likewise, in some instances, the system controls the color of the light produced by the illuminator based on the position of a person in the room.

Modulated light can be used advantageously to detect the location of objects (including people) in the room by using, for example, time-of-flight optical detection techniques based on the modulated light reflected from the objects. In some cases, the modulated light is in the visible part of the spectrum, such that the visible light also illuminates the room. The visible light can be intensity-modulated at a frequency sufficiently high (e.g., tens or even hundreds of mega Hertz (MHz)) so as not to be generally perceptible to the human eye. In some instances (e.g., when the visible light source is turned off), the modulated light can be generated by an infra-red (IR) or near-IR light source. In response to detecting that an object (e.g., a person) is in the room or at a particular location in the room, the visible light source can be turned on, and characteristics (e.g., intensity; color) of the light produced by the visible light source can be controlled.

Figure 1:
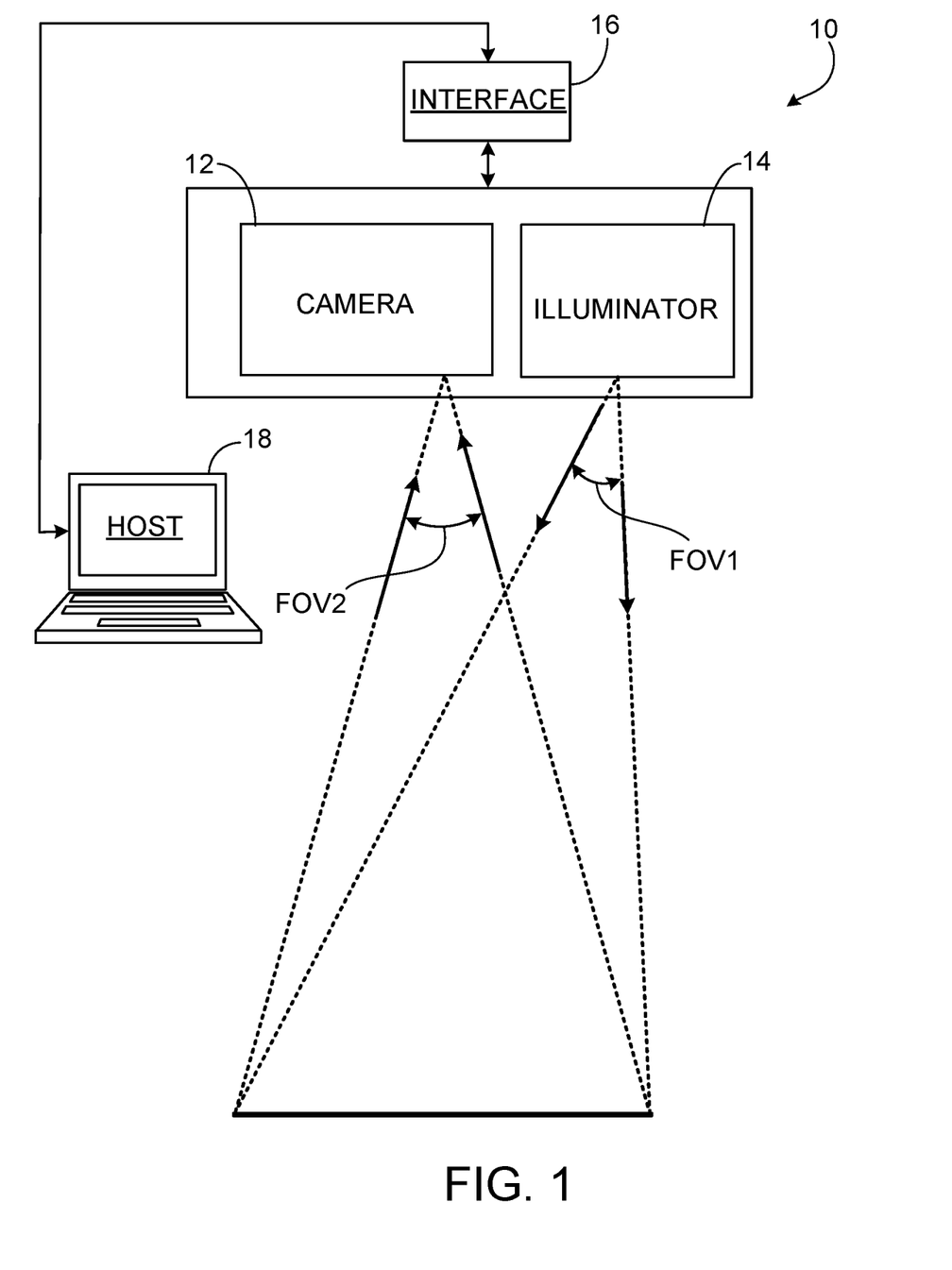
FIG. 1 illustrates an example of an intelligent lighting system.

As shown in FIG. 1, an example of an intelligent illumination system 10 includes a time-of-flight (TOF) camera 12, an illuminator 14 including a modulated light source, an interface 16, and a host controller 18. The illuminator 14 is operable to emit modulated light (e.g., at a frequency of 10 MHz or more) at a particular wavelength that is detectable by the TOF camera 12, which includes demodulation pixels. The illuminator 14 can be installed, for example, as an overhead, table top or other light fixture that provides ambient light in a room. The illuminator 14 has a first field of view (FOV1), and the camera 12 has a second field of view (FOV2) that substantially overlaps the illuminator's field of view. Light from the illuminator 14 can be reflected by objects in the room back toward the TOF camera 12, which is operable to sense the reflected light to produce image data. The TOF camera 12 further is operable to resolve distance data based on the known speed of light by measuring the time-of-flight of light signals between the camera 12 and points of an object. The distance data can be provided, by way of an electronic interface 16, to a host computing device 18 (e.g., a desktop or laptop computer) that includes a programmed microprocessor or other processing unit. In response, the computing device 18 can generate signals to control the illuminator 14, for example, by turning the visible illumination on (or off) and/or adjusting the characteristics of the emitted visible light in some other way.

Figure 2:
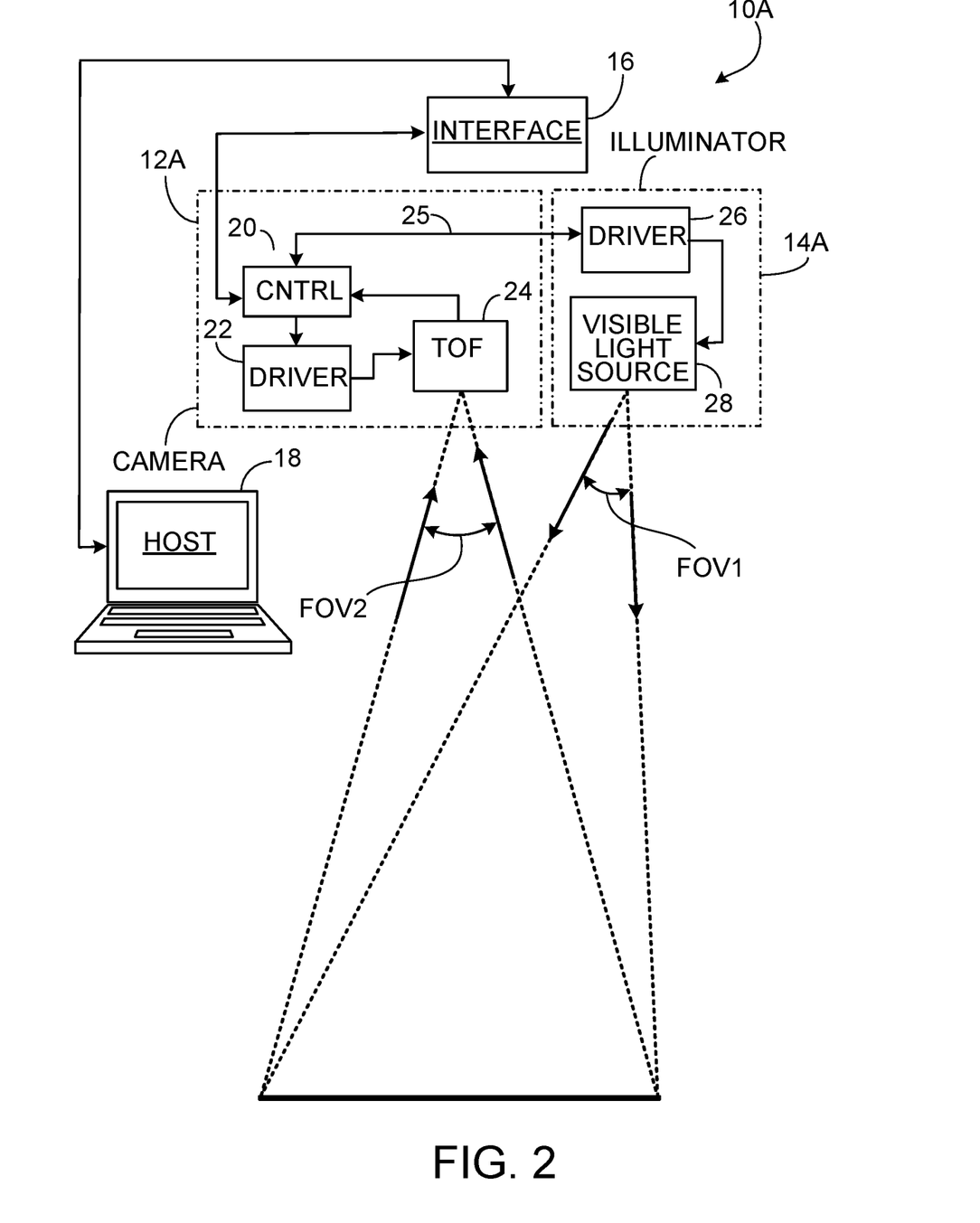
FIG. 2 illustrates further details of an intelligent lighting system according to some implementations.
Figure 3:
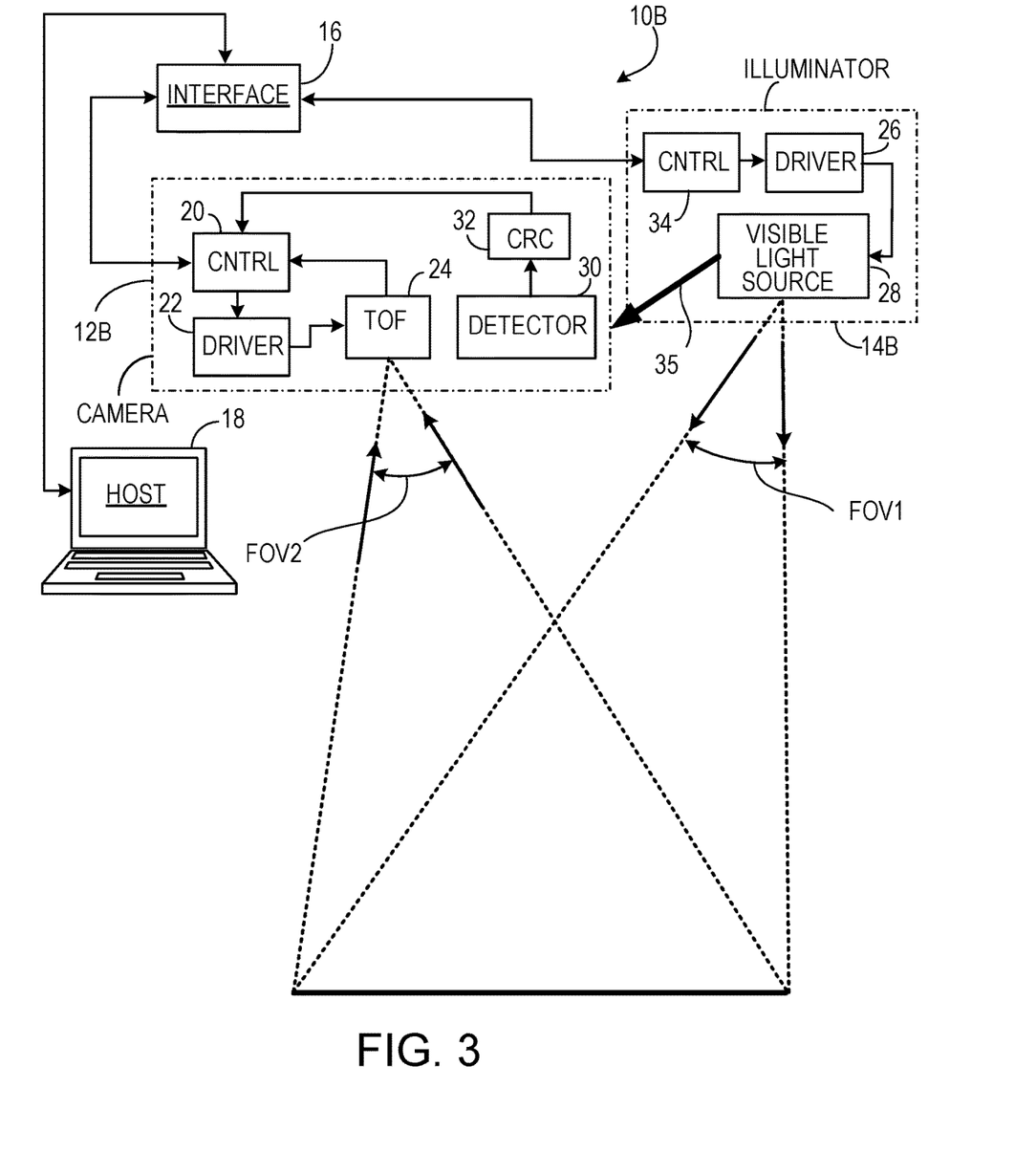
FIG. 3 illustrates further details of an intelligent lighting system according to some implementations.

FIGS. 2 and 3 illustrate further details according to some implementations. As shown in the intelligent illumination system 10A of FIG. 2, the illuminator 14A includes a high-speed electronic driver 26 operable to drive a light source 28 at a frequency, for example, of 10 MHz or more. The light source 28 is operable to emit visible light, although in some cases, it also may be operable to emit IR light. The light source 28 can be implemented, for example, as a light-emitting diode, an array of light emitting diodes, a laser diode, an array of laser diodes, a phosphor or series of phosphors.

The camera 12A includes a controller 20, a high-speed electronic driver 22 and a TOF sensor chip 24. The camera 12A also can include an optical element assembly to help capture light reflected back toward the camera. The optical element assembly can include filters, refractive lenses, diffractive lenses, apertures, and/or baffles. The TOF sensor chip 24 is sensitive at least to visible light and includes an array of spatially distributed light sensitive elements (e.g., pixels), as well as electronics and logic to read and process the pixel signals. Circuitry in the TOF sensor chip 24 is operable to use output signals from the pixels to calculate, for example, the time the light has taken to travel from the emitter to an object of interest and back to the focal plane array. The TOF sensor chip 24 can resolve distances based on the known speed of light by measuring the time-of-flight of a light signal between the sensor and the subject for each point of an object.

The interface 16 can be implemented, for example, as a Bluetooth or other wireless interface operable to receive TOF data, such as object-induced phase-shift signals, and to communicate the TOF data to the host device 18. The interface 16 also is operable to communicate control signals or other information from the host device 18 to the TOF camera 12 and/or illuminator 14.

In the example of FIG. 2, the modulated visible light source 28 and the TOF camera 12A are sufficiently close to one another such that the modulation signal can be sent from the controller 20 in the camera 12A to the driver 26 in the illuminator 14A over a wired connection 25. In this way, the modulation signal can be synchronized in both the camera 12A and the illuminator 14A. In operation, the camera's controller 20 generates a modulation signal, which is provided to the TOF sensor chip 24, as well as to the driver 26 in the illuminator 14A via the wired connection 25. The driver 26 then uses the modulation signal to modulate the illumination generated by the light source 28 at the modulation frequency. In some instances, the modulation signal is amplified and/or buffered before being transmitted over the wired connection 25 to the illuminator 14A. On the other hand, in some instances, the modulation signal is amplified and/or buffered after being transmitted over the wired connection 25 to the illuminator light source 28. This can be useful, for example, in situations where strong losses occur.

The implementation of an intelligent illumination system 10B of FIG. 3 provides a wireless (e.g., optical) connection 35 between a TOF camera 12B and an illuminator 14B. In this example, the camera 12B includes the same components as the camera 12A in FIG. 2, and further includes a supplemental optical detector (e.g., a photodiode) 30 and a clock recovery circuit (CRC) 32. The illuminator 14B includes the same components as the illuminator 14A in FIG. 2, and further includes its own controller 34. The illuminator controller 34 generates a modulation control signal for the driver 26 via a high-speed clock signal, which can be generated, for example, by a locally placed electronic clock generator or a crystal oscillator and a subsequent high-speed amplification stage. The driver 26 then drives the light source 28 to produce modulated light. In this example, some of the modulated light produced by the light source 28 also illuminates the supplemental detector 30, which facilitates synchronization of the modulation frequency of both the camera 12B and illuminator 14B by communicating the modulated light signal to the camera 12B.

In some implementations, recovery of the clock signal includes the following steps. For example, the supplemental detector 30 can detect the photo-signal and convert it into an electric photo-current that is provided to the CRC 32. In some cases, the CRC 32 amplifies the photo-current, and converts the current into a voltage. The CRC 32 can include, for example, a trans-impedance amplifier for this purpose. The CRC 32, which can include, for example, a Schmitt trigger, then can digitize the analog signal. A binary output signal from the CRC 32 can be provided as an input signal to the controller 20 in the camera 12B to control demodulation of the signals in the TOF sensor chip 24.

The implementations of FIGS. 2 and 3 can provide relative distance data. In some implementations, however, the modulated visible light source 28 can be integrated into the TOF camera 12A or 12B. Preferably, the TOF camera includes a reference pixel to detect the modulated output signal from the light source. Integrating the light source 28 into the TOF camera can be useful for implementations in which it is desirable to generate absolute distance data. Such implementations also can, in some cases, compensate for phase shifts caused, for example, by thermal drift.

Figure 4:
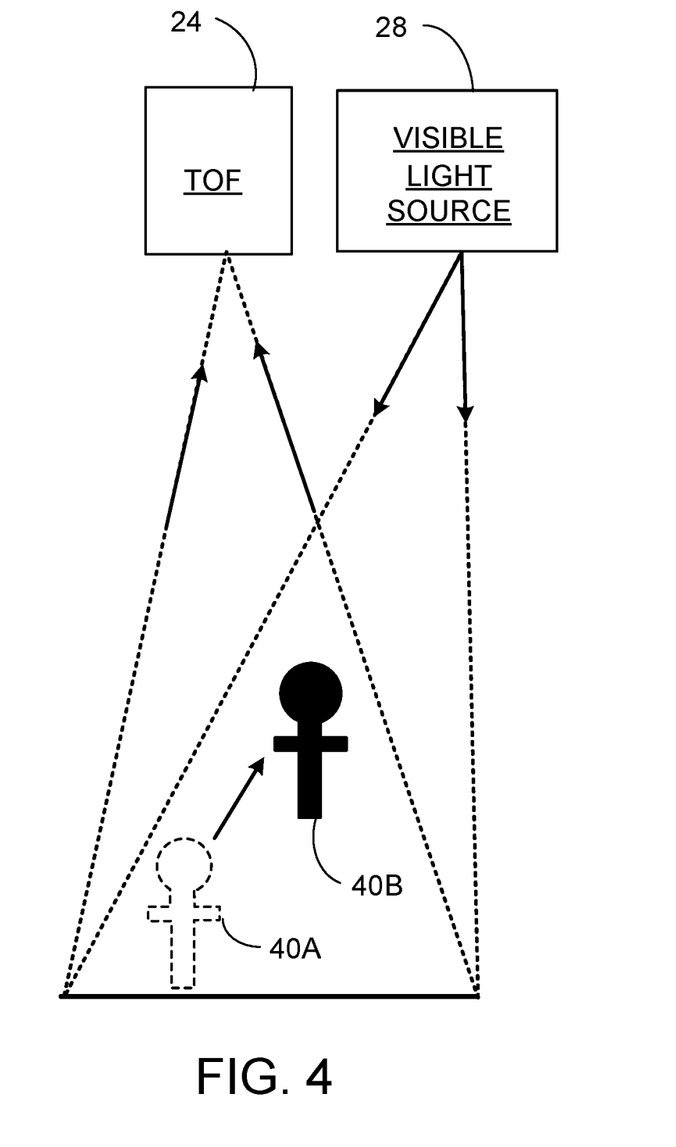
FIG. 4 illustrates a first application of an intelligent lighting system.

FIG. 4 illustrates a first application of the intelligent illumination system according to some implementations. In this example, it is assumed that a person is at a first location 40A in a room illuminated with modulated light generated by the visible light source 28. Some of the modulated light is reflected by the person while at the first location 40A and the reflected light is detected by the TOF sensor 24. The sensed signals allow three-dimensional image data (i.e., image data containing distance information) to be generated indicative of the person's location in the room. At some later time, the person may be move to a second location 40B in the room. Once again, signals detected by the TOF sensor 24 allow three-dimensional image data (i.e., image data containing distance information) to be generated indicating that the person is now at the second location 40B. The host 18 can be configured to use this information, for example, to adjust the intensity of the light produced by the light source 28. Such an adjustment may be desirable, for example, when different parts of the room are associated with different types of tasks. Thus, in some scenarios, the second location 40B may be near a desk where a person may require more light to facilitate reading or writing. By detecting that the person is at the second location 40B, the host 18 can generate one or more control signals to cause the intensity of the modulated light from the light source 28 to be increased. In other situations, it may be desirable to adjust the light produced by the light source 28 in other ways (e.g., by decreasing the intensity of the modulated light or by adjusting its color temperature). In general, different areas of a room can be associated with different lighting needs. By detecting the presence or location of a person in the room, the lighting can be adjusted automatically.

Figures 5A, 5B, 5C:
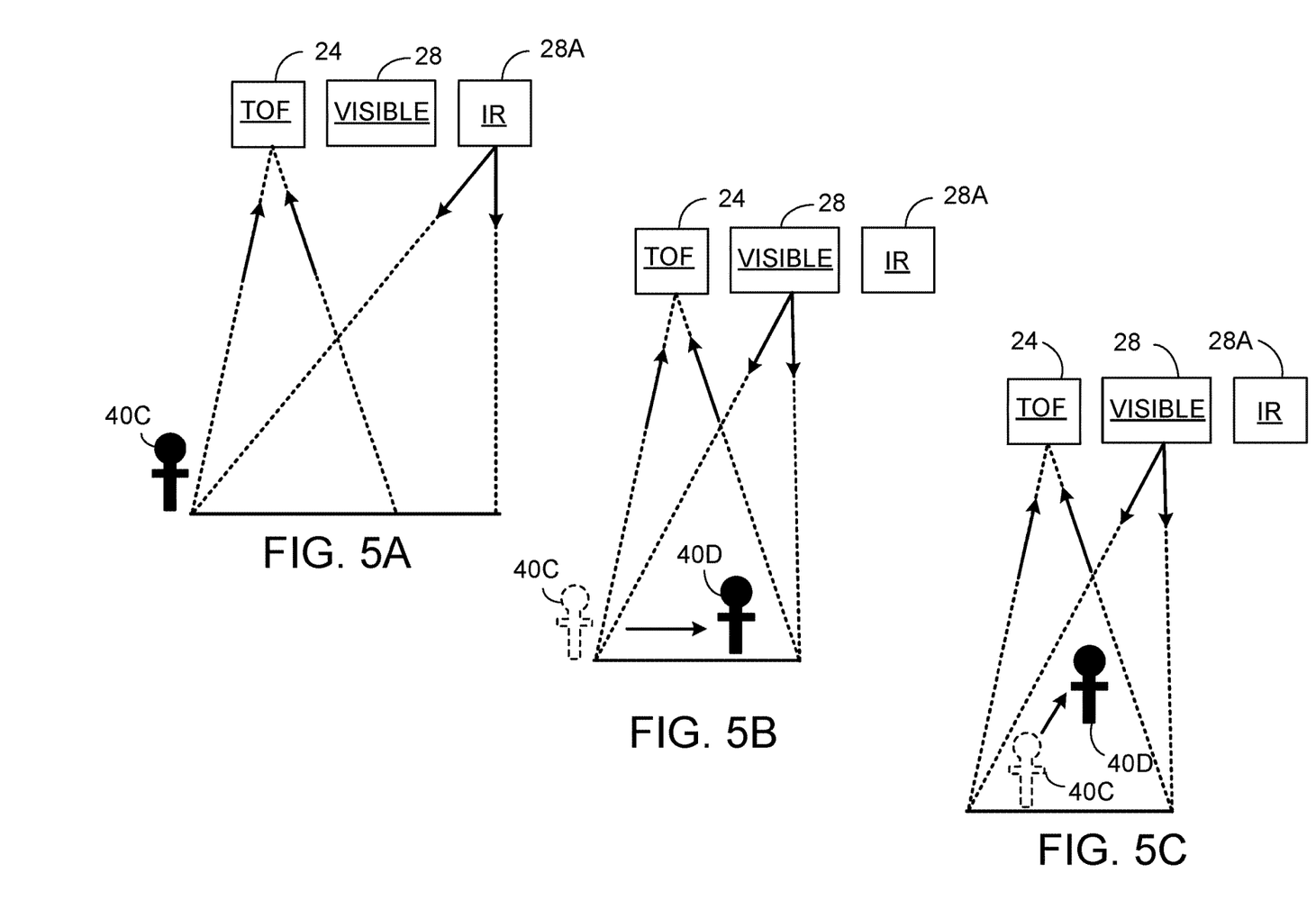
FIGS. 5A, 5B and 5C illustrate a second application of an intelligent lighting system.

FIGS. 5A, 5B and 5C illustrate another implementation, which addresses detection of a person entering a room when the visible light source 28 is turned off. In this case, the illuminator 14 includes, in addition to the visible light source 28, an IR light source 28A that produces modulated IR radiation. The TOF sensor 24 is operable to sense light in the IR range of the spectrum (e.g., wavelengths of 1-100 µm) as well as light in the visible part of the spectrum (e.g., wavelengths of 390-700 nm). In this example, as indicated by FIG. 5A, it is assumed that initially the visible light source 28 is off, the IR light source 28A is on, and the person is located outside the room (or outside the field-of-view of the light sources and TOF sensor) at a location 40C. When the person enters the room, some of the modulated IR radiation produced by the IR light source 28A is reflected by the person and is detected by the TOF sensor 24. Signals detected by the TOF sensor 24 allow three-dimensional image data (i.e., image data containing distance information) to be generated indicating that a person has entered the room. The host 18 can be configured to use this information, for example, to turn on the visible light source 28, as indicated by FIG. 5B, which shows the person at a location 40D inside the room. As the person moves around the room, the TOF sensor 24 continues to detect the modulated, visible light reflected by the person. As before, signals detected by the TOF sensor 24 allow three-dimensional image data (i.e., image data containing distance information) to be generated indicating the person's location within the room. The host 18 can be configured to use this information as needed to adjust the lighting characteristics in the room. For example, if it is determined that the person has moved to a location requiring more light (e.g., location 40D, as shown in FIG. 5C), the host 18 can generate one or more control signals to cause the intensity of the modulated light from the visible light source 28 to be increased (or adjusted in some other appropriate manner). Further, if the host determines that the person no longer is in the room, the host can generate one or more control signals to cause the visible light source 28 to be turned off and to cause the IR light source 28A to be turned back on (if it previously was turned off).

Figure 6A:
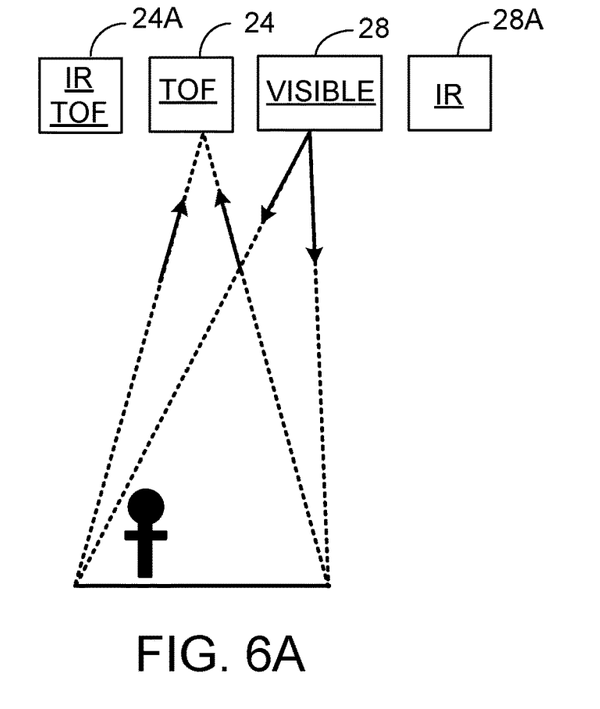
FIGS. 6A and 6B illustrate a third application of an intelligent lighting system.
Figure 6B:
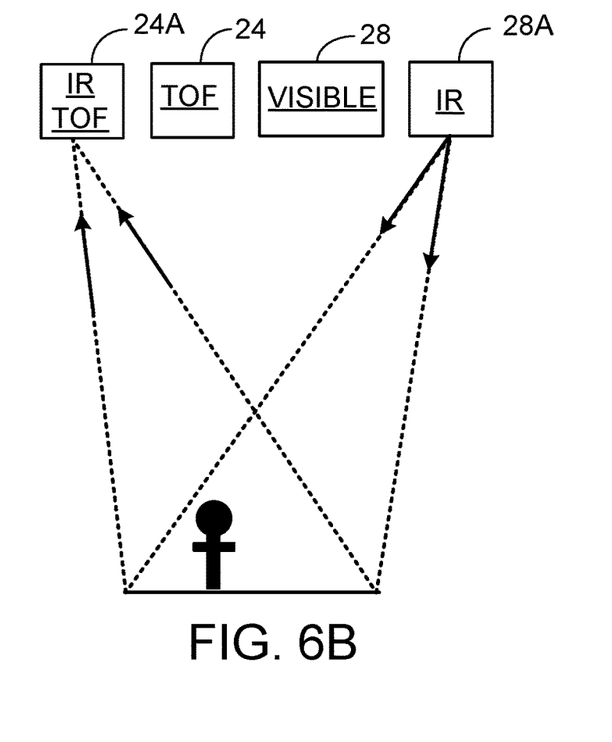

In the implementation of FIGS. 5A-5C, the same TOF sensor 24 is operable to detect and demodulate optical signals in the visible range of the spectrum as well as the IR range of spectrum. In some implementations, it may be desirable to detect the IR and visible light using different TOF sensors. An example is illustrated in FIGS. 6A-6B, in which an intelligent illumination system includes a modulate visible light source 28, a modulated IR light source 28A, a first TOF sensor 24 operable to detect and demodulate optical signals in the visible part of the spectrum (i.e., at the wavelength produced by the light source 28), and a second TOF sensor 24A operable to detect and demodulate optical signals in the IR part of the spectrum (i.e., at the wavelength produced by the light source 28A). Depending on the application, the TOF sensors 24, 24A can be in the same or different cameras. Further, in some implementations, some pixels in a TOF sensor can be sensitive only to visible light whereas other pixels in the same TOF sensor can be sensitive only to IR light. Such an implementation, which can allow visible and IR signals to be detected using a single TOF sensor, can be achieved, for example, by providing appropriate optical filters over the pixels.

In the implementation of FIGS. 6A-6B, the host 18 can adjust the lighting automatically in response to determining the presence or location of a person in the room based on image and position data from the TOF sensors 24, 24A. More specifically, when no one is in the room, the visible light source 28 may be turned off so as to conserve energy. While the visible light source 28 is off, the modulated IR light source 28A can be turned on so that three-dimensional image data (i.e., containing distance information) based on signals from the second TOF sensor 24A can be used to detect the presence of a person in the room. In response, the host 18 can generate one or more control signals to cause the visible light source 28 to be turned on, and to cause the IR light source 28A to be turned off. While the visible light source 28 is on, the first TOF sensor 24 can be used to detect the location of the person as she moves about the room, as described above.

In some situations, the level of background, non-modulated visible light may be relatively high such that the first TOF sensor 24 cannot detect the modulated visible light effectively. Such situations may occur, for example, when a lot of sunlight streams through a window in the room or when other non-modulated lighting is provided in the room. In such situations, the host 18 can generate one or more control signals to cause the IR light source 28A to be turned on. The modulated IR light signals then can be used by the host 18 to detect movement or a change in position of a person in the room (i.e., by using three-dimensional image data (i.e., image data containing distance information) generated by the second TOF sensor 24A). In response, the host 18 can generate one or more signals to adjust the characteristics (e.g., intensity) of the visible light produced by the visible light source 28, as previously described.

In FIGS. 6A-6B, the IR light source 28A and the second TOF sensor 24 can be coupled, for example, to controllers, drivers and other components of the intelligent lighting including the host 18, in a manner similar to what is described in connection with the visible light source 28 and TOF sensor 24 in FIGS. 1, 2 and/or 3.

Figure 7:
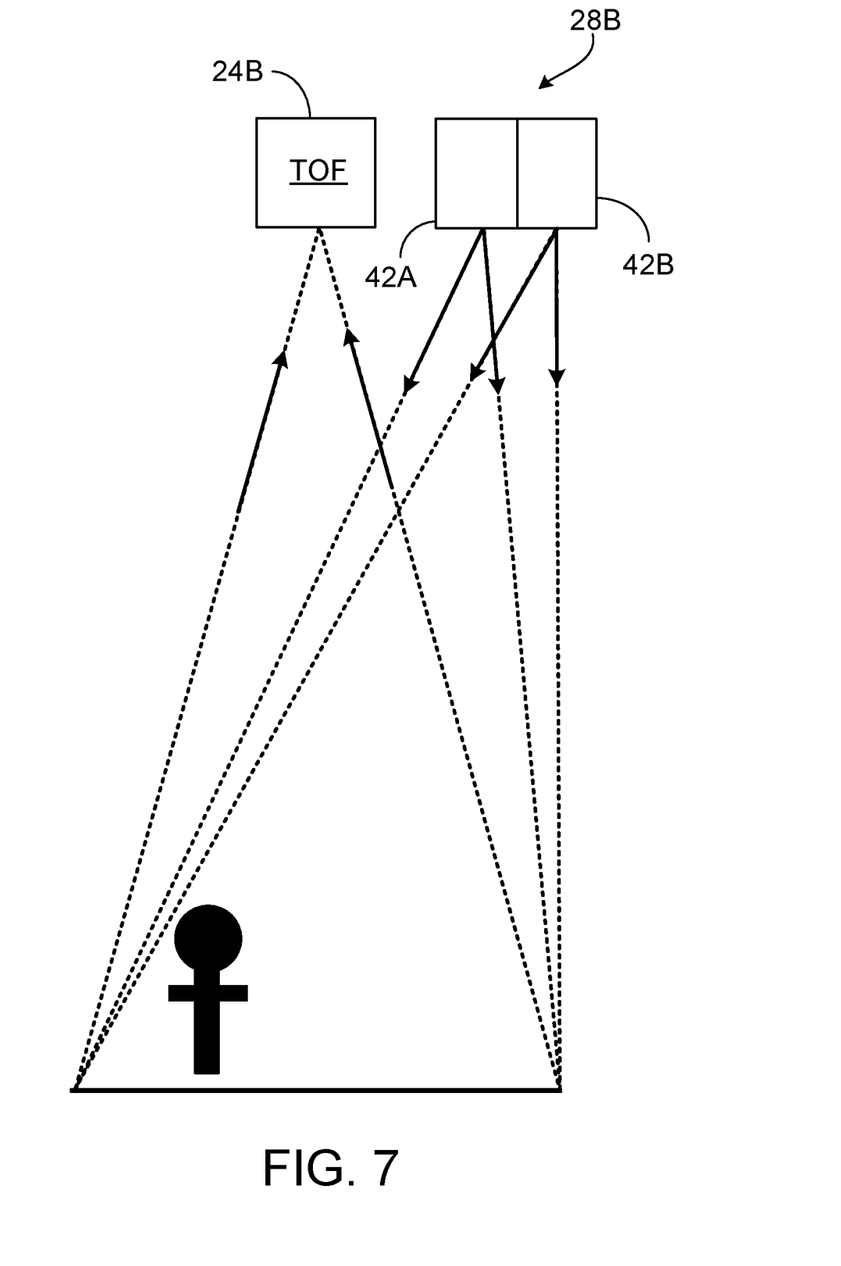
FIG. 7 illustrates a fourth application of an intelligent lighting system.

In the foregoing examples, the host 18 generates control signals to control the intensity of the modulated light produced by the visible light source 28. As previously noted, however, in some instances, the host 18 can generate control signals to control other characteristics of the modulated light produced by the visible light source 28, such as its color temperature. For example, in some cases, it may be desirable to maintain a particular color temperature in a room even as the amount of light from other sources (e.g., sunlight) entering the room changes. FIG. 7 illustrates an example of a visible light source 28B and TOF sensor 24B for implementing such an intelligent lighting system.

As shown in FIG. 7, the light source 28B includes two or more light emitting elements 42A, 42B each of which is operable to produce visible light of a different respective wavelength or range of wavelengths. The light emitting elements 42A, 42B can be implemented, for example, by LEDs, laser diodes or arrays of such light emitting elements. The TOF sensor 24B has one or more pixels that are sensitive to the wavelengths of light emitted by the light emitting elements 42A, 42B, and is operable to collect spectral and distance data based on light reflected from objects in the room.

An example of such a pixel is described in U.S. Provisional Patent Application No. 62/239,047, the disclosure of which is incorporated herein by reference. Each pixel of the TOF sensor 24B can be a demodulation pixel (e.g., a drift-field demodulation pixel) having a photo-sensitive detection region, a multitude of gates, an insulator layer, a semiconductor substrate with a thickness and lateral dimension, a charge-collection region, and a multitude of contact nodes, wherein potentials are applied to the multitude of contact nodes generating a multitude of potential regions varying in magnitude with the lateral dimension of the semiconductor substrate. Photo-generated charges are generated from multi-wavelength electromagnetic radiation incident on the photo-sensitive detection region, wherein respective portions of the multi-wavelength electromagnetic radiation incident on the photo-sensitive detection region generate respective corresponding portions of the multitude of photo-generated charges. Further, in such implementations the multitude of potential regions within the semiconductor substrate is operable to conduct the photo-generated charges from the photo-sensitive detection region to the charge-collection region. Further, in such implementations, the respective portions of the photo-generated charges are conducted to the charge-collection region with respective drift velocities that vary respectively in magnitude with the thickness of the semiconductor substrate. The respective portions of photo-generated charges can be sampled at the output nodes with a multitude of respective sampling period profiles. Accordingly, image, spectral data and distance data can be generated and collected.

The host 18 can use the spectral data from the TOF sensor 24B to control the respective intensities of the visible light produced by each of the light emitting elements 42A, 42B. As noted above, the intensities of the visible light produced by each of the light emitting elements 42A, 42B can be controlled to achieve or maintain a particular color temperature for the room. Further, in some cases, the host 18 can use the image and/or distance data obtained from the TOF sensor 24B to adjust the overall color temperature based on the location of a person in the room or based on the number of people present in the room. For example, if the host 18 determines that a person is at a first location in the room, the host would generate one or more control signals to cause one or more of the light emitting elements 42A, 42B to adjust their respective intensities to achieve an overall cooler color temperature, whereas if the host 18 determines that a person is at a second location in the room, the host would generate one or more control signals to cause one or more of the light emitting elements 42A, 42B to adjust their respective intensities to achieve an overall warmer color temperature. In some implementations, the host 18 can cause the light emitting elements 42A, 42B to adjust their respective intensities to achieve a specified color temperature for optimal skin tone.

Figure 8:
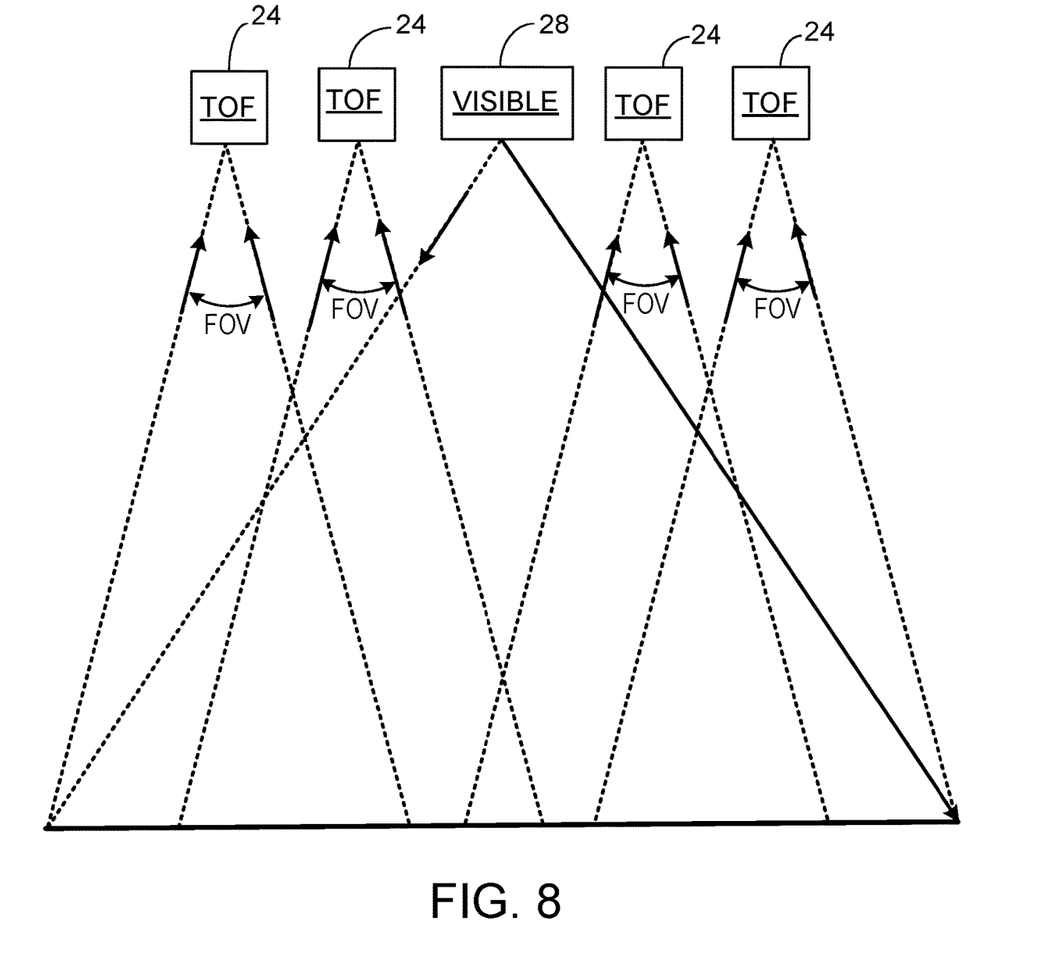
FIG. 8 illustrates a fifth application of an intelligent lighting system.

In some cases, the intelligent lighting system can include multiple TOF sensors 24, as shown in FIG. 8. This can be advantageous, for example, where the field of view (FOV) of each TOF sensor 24 covers only a portion of the room illuminated by the modulated light source 28. In this case, each TOF sensor 24 has a respective FOV such that collectively the TOF sensors 24 cover the entire room, or a significant portion of the room. In some instances, it is desirable for the fields of view of the TOF sensors 24 to overlap one another at least partially, as illustrated in FIG. 8. For example, the host 18 can use overlapping images obtained by different ones of the TOF sensors 24 to perform image registration, which then can be used to compensate for drifts or other differences in the modulation frequency of the various TOF sensors. The host 18 also can use the acquired information to perform relative distance compensation.

In each of the implementations of FIGS. 3-8, the host 18 can be coupled wirelessly, for example, to the visible and IR light sources, as well as the TOF sensor(s), as described, for example, in connection with FIG. 2 or 3. The host 18 can be coupled to the light sources and/or TOF sensors in other ways as well.

Although the foregoing examples refer to an intelligent lighting in a room, the intelligent lighting systems also can be used in other spaces. Likewise, although the foregoing examples refer to detecting the presence or movement of a person in the room or other space, the intelligent lighting systems can be used in connection with detecting the presence or movement of other objects as well.

Various modifications can be made within the scope of the invention. Further, features from the various examples described above can be combined. Accordingly, other implementations are within the scope of the claims.

What is claimed is:

1. A method comprising:
producing, by a light source, modulated illumination in a visible part of the spectrum at a modulation frequency;
synchronizing a modulation signal at the modulation frequency between the light source and a light sensor, the light sensor including a time-of-flight sensor;
detecting three-dimensional image data using the time-of-flight sensor based on at least a portion of the modulated light produced by the light source and reflected by a scene; and
changing a characteristic of the modulated illumination based on the detected three-dimensional image data.

2. The method of claim 1 wherein changing a characteristic of the modulated illumination includes changing an intensity of the modulated illumination.

3. The method of claim 2 including changing an intensity of the modulated illumination based on a location of an object in the scene as determined from the three-dimensional image data.

4. The method of claim 1, wherein the modulated illumination illuminates a room, and
wherein changing a characteristic of the modulated illumination includes changing a color temperature of the modulated illumination to achieve or maintain a particular color temperature for the room.

5. The method of claim 2, wherein the modulated illumination illuminates a room, and further including changing a color temperature of the modulated illumination based on a location of an object in the scene as determined from the three-dimensional image data to achieve or maintain a particular color temperature for the room.

6. The method of claim 2 including changing a color temperature of the modulated illumination based on a number of persons in the scene as determined from the three-dimensional image data.

7. The method of claim 1 wherein a frequency of the modulated illumination is sufficiently high so as not to be generally perceptible to the human eye.

8. An apparatus comprising:
an illuminator including a first light source operable to produce modulated illumination in a visible part of the spectrum;
a driver operable to drive the first light source at a modulation frequency;
a light sensor operable to detect three-dimensional image data based at least on a portion of the modulated illumination reflected by a scene, wherein the light sensor includes a time-of-flight sensor and a controller;
a connection between the controller and the driver, such that a modulation signal at the modulation frequency is synchronized between the light sensor and the illuminator; and
a host device operable to receive signals indicative of the three-dimensional image data and operable to generate one or more control signals to affect a change in a characteristic of the modulated illumination of the first light source based on the signals indicative of the three-dimensional image data.

9. The apparatus of claim 8 wherein the host device is operable to affect a change in an intensity of the modulated illumination based on the signals indicative of the three-dimensional image data.

10. The apparatus of claim 9 wherein the host device is operable to affect a change in the intensity of the modulated illumination based on a location of an object in the scene as determined from the three-dimensional image data.

11. The apparatus of claim 8 wherein the host device is operable to affect a change in a color temperature of the modulated illumination based on the signals indicative of the three-dimensional image data.

12. The apparatus of claim 11 wherein the host device is operable to affect the change in color temperature of the modulated illumination based on a location of an object in the scene as determined from the three-dimensional image data.

13. The apparatus of claim 11 wherein the host device is operable to affect the change in color temperature of the modulated illumination based on a number of persons in the scene as determined from the three-dimensional image data.

14. The apparatus of claim 8 wherein the illuminator includes a second light source operable to produce modulated illumination in an infra-red part of the spectrum,
wherein the light sensor is further operable to detect three-dimensional image data based at least on a portion of the modulated infra-red illumination reflected by a scene, and
wherein the host device is further operable to:
determine presence of the object based on the three-dimensional image data generated from the modulated infra-red illumination reflected by the scene and detected by the light sensor, and
generate, in response to determining the presence of the object, one or more control signals to cause the first light source to be turned on.

15. The apparatus of claim 8 wherein the illuminator includes a second light source operable to produce modulated illumination in an infra-red part of the spectrum,
the apparatus including light sensitive elements operable to detect three-dimensional image data based at least on a portion of the modulated infra-red illumination reflected by the scene, and
wherein the host device is further operable to:
generate one or more control signals to cause the second light source to be turned on under specified conditions;
detect a location of an object based on the three-dimensional image data acquired by the light sensitive elements; and
in response to detecting the location of the object, generate one or more signals to adjust a characteristic of the modulated light produced by the first light source.

16. An apparatus comprising:
an illuminator including a first light source having a plurality of light emitting elements, each of which is operable to produce modulated light of a different respective wavelength or range of wavelengths in a visible part of the spectrum;
a light sensor including one or more pixels that are sensitive to the wavelengths of light emitted by the light emitting elements, the light sensor being operable to collect spectral and three-dimensional image data based on light reflected from the scene;
a host device operable to:
receive signals indicative of the spectral and three-dimensional image data; and
generate one or more control signals to adjust an intensity of at least one of the light emitting elements based on the spectral and three-dimensional image data.

17. The apparatus of claim 16 wherein the host device is operable to generate the one or more control signals to achieve or maintain a particular color temperature.

18. The apparatus of claim 16 wherein the host device is operable to generate the one or more control signals to adjust a color temperature based on a location of a person detected or based on presence of a number of people detected.

* * * * *